Nov. 26, 1963  B. F. FISTE  3,112,011
ONE-WAY RELEASABLE CLUTCH MECHANISM
Filed July 26, 1961
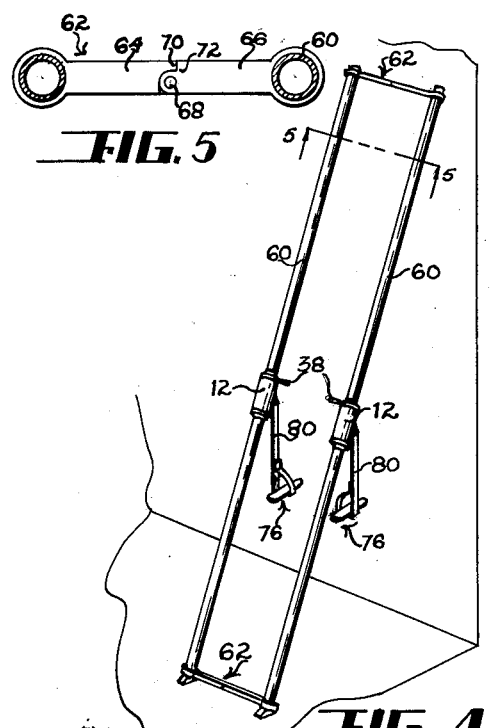
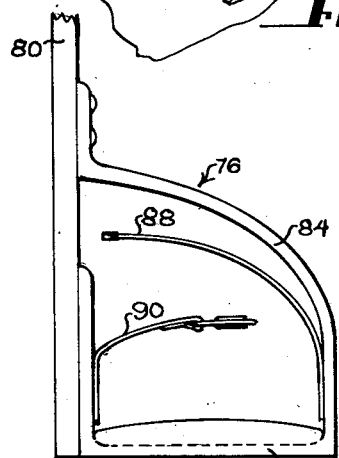
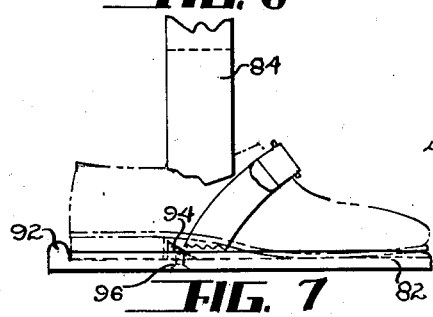
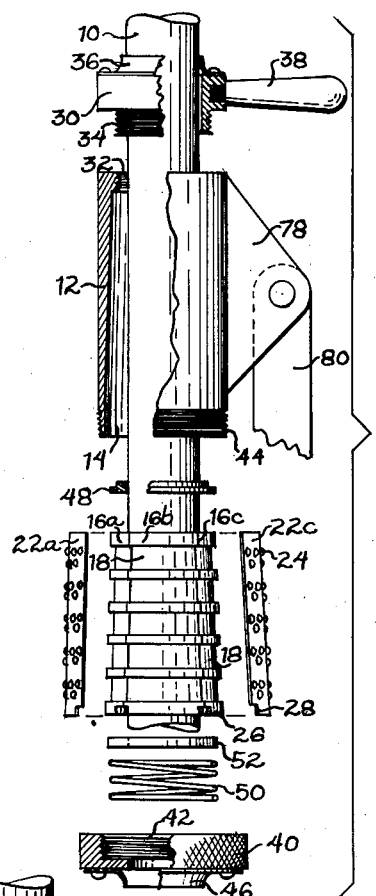
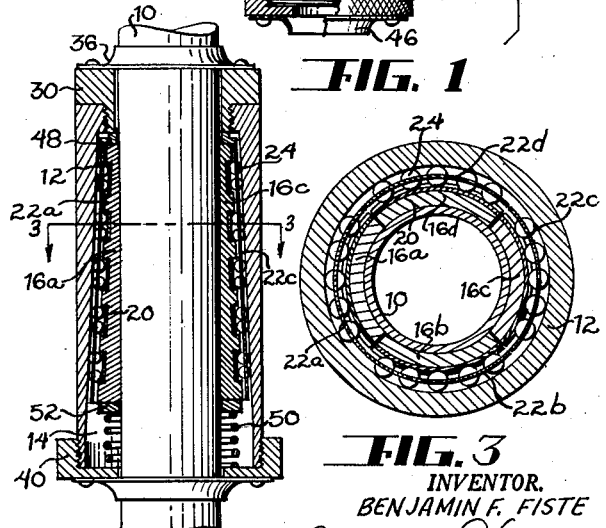
INVENTOR.
BENJAMIN F. FISTE
BY
HIS ATTORNEYS

United States Patent Office 3,112,011
Patented Nov. 26, 1963

3,112,011
ONE-WAY RELEASABLE CLUTCH MECHANISM
Benjamin F. Fiste, Eldorado, Ohio
(323 W. Water St., Greenville, Ohio)
Filed July 26, 1961, Ser. No. 126,973
6 Claims. (Cl. 182—134)

This invention relates to a one-way releasable clutch mechanism and more particularly to a clutch mechanism adapted to operate between an elongate shaft member and a housing journalled for sliding movement on the shaft member, the clutch mechanism permitting free sliding movement of the housing relative to the shaft member in one direction and normally prohibiting movement of the housing relative to the shaft member in the opposite direction. The present application also relates to a novel application of the aforementioned clutch mechanism to the formation of rungless stepladder devices. However, the invention is not necessarily so limited.

One object of the present invention is to provide a new and improved clutch mechanism adapted to engage a shaft passing therethrough, said clutch member seizing said shaft upon relative axial movement therebetween in one direction and releasing said shaft upon relative axial movement therebetween in the opposite direction.

Another object of the present invention is to provide a new and improved clutch mechanism adapted to engage a shaft member passing therethrough, said clutch mechanism including adjustable means to selectively prevent seizure of said shaft.

Another object of the present invention is to provide a releasable cone clutch member of new and improved construction.

Still another object of the present invention is to provide a rungless ladder construction wherein one or more releasable one-way clutch mechanisms are disposed on one or more upright shaft members, said clutch mechanisms carrying stirrups to enable an individual to raise himself on the shaft members by sliding the clutch members upwardly with his feet.

Other objects and advantages reside in the construction of parts, the combination thereof, the method of manufacture and the mode of operation, as will become more apparent from the following description.

FIGURE 1 is an exploded view of the clutch mechanism of the present invention.

FIGURE 2 is a longitudinal sectional view of the clutch mechanism.

FIGURE 3 is a sectional view taken substantially along the line 3—3 of FIGURE 2.

FIGURE 4 is a perspective view of a rungless ladder constructed with a pair of clutch members of the type disclosed in FIGURES 1, 2 and 3.

FIGURE 5 is a sectional view taken substantially along the line 5—5 of FIGURE 4.

FIGURE 6 is an enlarged front elevation view of stirrups carried by the clutch members of FIGURE 4.

FIGURE 7 is an enlarged fragmentary side elevation view of the stirrup of FIGURE 6 illustrating a foot position in the stirrup in phantom detail.

Referring to the drawings in greater detail, FIGURE 1 illustrates the clutch mechanism of the present invention exploded along a shaft 10 which is of the proper shape and dimensions for seizure by the clutch mechanism.

The clutch mechanism comprises a tubular housing 12 having an interior tapered wall 14 of circular cross-section, this wall converging as it moves from one end to the other end of the housing. Adapted to fit within the housing 12 are a plurality of individual collet members 16a, 16b, 16c and 16d, the latter appearing in FIGURE 3 only. These collet members are of arcuate shape and cooperate one with another to form a segmental sleeve surrounding the shaft 10 when assembled within the housing 12. Each collet member is also tapered axially in a manner complementary to the taper of the interior wall 14 of the housing 12, the result being that the exterior surfaces of the collet members extend generally parallel to the interior wall 14 of the housing while the interior surfaces of the collet members conform to the cross-sectional shape of the shaft 10. These collet members are formed of any suitable friction clutch material so as to frictionally engage the shaft 10 when pressed thereagainst.

Each collet member 16 is provided with axially spaced transverse grooves 18 in the exterior surface thereof. In the preferred embodiment, each of these grooves 18 is lined along the base thereof with a metallic insert 20 as best seen in FIGURES 2 and 3.

In the assembled clutch mechanism, the spaces between the bases of the grooves 18 and the interior wall 14 are preferably filled with antifriction spacer means in the form of ball bearing elements 24. These ball bearing elements are held in fixed relation by perforated arcuate cages 22a, 22b, 22c and 22d, the bearing elements being seated in the perforations. As will become more apparent in the following, the ball bearing elements 24 are adapted to react against the interior wall 14 of the housing so as to press the collet members 16 against the shaft 10. During such operation the metal inserts 20 in the grooves 18 of the collet members function to protect the clutch material in the collet members from peening by the ball bearing elements 24.

It will be noted that the grooves 18 trap the ball bearing elements 24 in the assembled device in such a manner as to form an interference fit limiting relative axial movement between the collet members and the caged ball bearing elements. To prevent relative rotary movement between the collet members and the caged ball bearing elements, each of the collet members is keyed to the overlying cage member by providing a projection 26 at each of the lower corners thereof which engages a complementary notch 28 formed in each of the lower corners of the cage elements 22.

The collet members 16 and cage elements 22 are confined within the housing 12 by means of end rings threadedly engaging the opposite ends of the housing. The upper end of the housing as viewed in FIGURE 1 is closed by an end ring 30 having a threaded projection 34 adapted to engage internal threads 32 at the upper end of the housing. As shown, the end ring 30 is provided with a dust shield 36 adapted to closely fit the wall of the shaft 10.

The lower end of the housing 12 is closed with an end ring 40 internally threaded at 42 to engage external threads 44 on the lower end of the housing. The end ring 40 is also provided with a dust shield 46 adapted to closely fit the exterior wall of the shaft 10.

Interposed between the upper end ring 30 and the upper ends of the collet members 16 is a washer 48 which provides a smooth bearing surface for the upper ends of the collet members. An additional washer 52 is positioned adjacent the lower ends of the collet members. This washer 52 is biased by a spring 50 which encircles the shaft 10 and bears against the lower end ring 40.

In assembling the clutch mechanism of FIGURES 1, 2 and 3, the lower end ring 40 is turned tightly onto the lower end of the housing while the upper end ring 30 is turned loosely into the upper end of the housing so as to be adjustable thereon. A handle 38 is secured to the upper end ring 30 to enable adjustment of this end ring. If the end ring 30 is rotated by means of the handle 38 so as to move the end ring outwardly of the housing, the spring 50 is enabled to push the collet members 16 upwardly in the housing as viewed in FIGURE 1 thereby causing the ball bearing elements 24 to press the collet members against the shaft 10. Any force tending to move the housing 12 downwardly relative to the shaft merely serves to increase the pressure applied to the collet members 16 such that the shaft 10 is more tightly gripped. Accordingly, the collet members 16 resist a downward movement of the housing with a force proportional to the downward pull on the housing 12.

In the event a force acts on the housing 12 to urge this housing upwardly relative to the shaft 10, the friction between the collet members 16 and the shaft results in a compression of the spring 50 and a consequent release of the pressure exerted by the ball bearing elements 24. As a consequence, the housing 12 is free to slide upwardly on the shaft 10. So long as the shaft 10 is of substantially uniform cross-section, the collet members will immediately seize the shaft 10 when the housing 12 is again urged downwardly. Thus, the clutch mechanism contained by the housing 12 may be characterized as a one-way clutch mechanism in the sense that it will seize the shaft 10 when the housing 12 is urged in one direction on the shaft but will release the shaft 10 when the housing is urged in the opposite direction. Conversely, when the housing is held stationary, the shaft 10 is seized when the latter is urged in one direction and released when the latter is urged in the opposite direction.

When the upper ring 30 is rotated by means of the handle 38 so as to draw this ring member inwardly of the housing 12, the collet members 16 are positively forced downwardly of the housing in opposition to the spring 50. Such downward movement of the collet members releases the pressure applied by the ball bearing elements 24 such that the housing 12 is freed to move in either direction relative to the shaft 10. The threaded connection between the end rings 30 and the housing 12 permits a gradual release of the pressure applied to the clutch members 16 such that any desired amount of frictional drag may be placed on movement of the housing 12 relative to the shaft 10 in the direction which normally results in seizure, this being the downward direction as viewed in FIGURE 1.

It will be noted that seizure occurs between the housing 12 and the shaft 10 when forces acting on these elements urge the shaft 10 relative to the housing 12 in the direction in which the interior wall 14 of the housing 12 converges. Thus, the direction of seizure may be characterized as the direction of convergence. Similarly, the direction of movement in which a release occurs may be characterized as the direction of divergence.

While the clutch mechanism of the present invention has been described with reference to a cylindrical shaft 10, it is to be understood that the application of the present clutch mechanism is not confined to cylindrical shafts. With suitable adjustment in the shape of the interior surfaces of the collet members 16, the clutch mechanism of the present invention can be adapted to engage shafts of an oval cross-sectional shape, as well as numerous other shapes. In the event the shaft has a rectangular shape, as one example, it will be readily apparent to those skilled in the art that two collet members having flat interior surfaces and disposed on opposite sides of the shaft can be used to provide the desired one way clutch action.

FIGURES 4–7 illustrate the adaptation of the above described clutch mechanism to the formation of a rungless ladder device. This ladder device comprises a pair of elongate poles or shafts 60 which are interconnected at their ends by hinged cross members 62. As best illustrated in FIGURE 5, the cross members 62 each comprise a pair of arms 64 and 66 which are hingedly joined on a pivot 68. Interengaging lugs 70 and 72 formed on the arms 64 and 66, respectively, align the arms in parallel when brought into engagement. The hinged connection between the arms 64 and 66 permits the poles 60 to be pivoted one toward the other for transportation and storage purposes. However, when the two poles are leaned against a vertical wall, as viewed in FIGURE 4, with the lugs 70 and 72 directed outwardly, the cross members rigidly support the poles 60 in parallel relation.

Mounted on each pole 60 is a clutch mechanism of the type described hereinbefore confined within a housing 12. The clutch mechanisms are so oriented that the direction of seizure is downward as viewed in FIGURE 4. Each of the housings 12 is adapted to carry a stirrup 76 by the provision of a flange 78 thereon as illustrated in FIGURE 1. Pivotally connected to the flange 78 on each housing 12 is a rigid stirrup strap 80. Secured to the lower end of each strap 80 is a loop member 84 which supports a foot rest 82 integral therewith. Belts 88 and 90 fixed to the inner wall of the loop member 84 are provided for securing one's foot on the foot rest.

As best seen in FIGURE 7, the rear end of the foot rest 82 is provided with a shoulder 92 adapted to engage the rear end of the heel of a shoe. A second adjustable shoulder 94 is provided inwardly of the foot rest for engaging the forward end of the heel of a shoe. A threaded screw element 96 is provided to lock the second shoulder 94 in a fixed position. The shoulders 92 and 94 cooperate with the belts 88 and 90 to firmly anchor one's shoe in the stirrup with the result that an operator having his shoes secured in the stirrups will be firmly positioned on the rungless ladder and will also be able to raise the clutch housings 12 by raising one foot or the other.

The operation of the rungless ladder is as follows. Initially, the clutch housings 12 are positioned at the lower end of their respective poles 60 such that the stirrups 76 carried by the clutch housings are at or near ground level. An operator desiring to use the ladder then positions his feet in the stirrups 76. The upper end rings 30 which threadedly engage the clutch housings are positioned outwardly of the housings at this point such that the clutch mechanisms confined in the housings 12 will tightly seize the rods 60 due to the weight of the operator standing on the stirrups 76.

By raising first one leg and then the other in a walking fashion, the operator may then elevate himself on the poles 60 to any desired elevation. When the operator desires to lower himself back to ground level, the handles 38 are adjusted to move the end rings 30 inwardly of the clutch housings 12 thereby reducing the friction forces between the poles 60 and the collet members 16. This permits the operator to slip down the poles 60 at a speed which can be controlled by adjustment of the handles 38.

While the rungless ladder has been disclosed as comprising two poles 60, it will be understood that a similar mode of operation can be achieved by placing two clutch mechanisms on a single pole, one clutch mechanism being located above the other. In such an arrangement, the stirrups 76 can be brought to the same level by increasing the length of the stirrup strap carried by the upper clutch housing.

While the present invention has been described with reference to formation of rungless ladders, it is not intended to limit the application of the subject clutch mechanism to rungless ladders. To those skilled in the art, it will be readily apparent that the subject clutch mechanism can be used, for example, as stock pushers and as tool supporting chucks in the machine tool art. Numerous other applications will occur to those skilled in the art.

Although the preferred embodiments of the devices have been described, it will be understood that within the purview of this invention various changes may be made in the form, details, proportion and arrangement of parts, the combination thereof and mode of operation, which generally stated consists in devices capable of carrying out the objects set forth, as disclosed and defined in the appended claims.

Having thus described my invention, I claim:

1. A clutch mechanism for engaging an elongate shaft member of uniform cross-section, said clutch mechanism comprising a tubular housing having an interior wall of arcuate cross-section which converges from one end to the other of said housing, a plurality of axially extending arcuate collet members disposed loosely within said housing and lining the interior wall thereof, said collet members having interior surfaces cooperating to establish a passage within said housing having a cross-section substantially matching the cross section of said shaft member and adapted to receive said shaft member, said collet members each tapering axially in a manner complementary to the convergence of the interior wall of said housing whereby said collet members have exterior surfaces which are substantially parallel to the interior walls of said housing, said collet members each having at least one circumferentially extending groove in the exterior surface thereof, antifriction spacer means seated in said groove for engaging the interior wall of said housing, and spring means disposed within said housing biasing said collet members axially relative to said housing in the direction of convergence of said interior wall to thereby force said spacer means into contact with said interior wall, the construction being such that the collet members frictionally engage said shaft member upon the latter being urged relatively through said passage in the direction of convergence of said interior wall, said collet members disengaging said shaft member when the latter is urged in the opposite direction.

2. The clutch mechanism according to claim 1 wherein said antifriction spacer means each comprise a plurality of ball bearing elements and including a cage member for each said collet member caging the ball bearing elements located in the groove of each collet member, the grooves in said collet members cooperating with said ball bearing elements to restrain axial movement of said cage members relative to said collet members.

3. The clutch mechanism according to claim 2, wherein the interior wall of said housing and the exterior surfaces of said collet members are circular in cross section and including interengaging means keying said cage members to their respective collet members so as to prevent rotation of said cage members and the ball bearing elements caged thereby about said collet members.

4. A clutch mechanism for engaging an elongate shaft member of uniform cross-section, said clutch mechanism comprising a tubular housing having an interior wall of arcuate cross-section which converges from one end to the other of said housing, a plurality of axially extending collet members disposed loosely within said housing and lining the interior wall thereof, said collet members having interior surfaces cooperating to establish a passage within said housing having a cross-section substantially matching the cross-section of said shaft member and adapted to receive said shaft member, said collet members each tapering axially in a manner complementary to the convergence of the interior wall of said housing, whereby said collet members have exterior surfaces which are substantially parallel to the interior wall of said housing, an antifriction bearing assembly interposed between each said collet member and the interior wall of said housing, each said bearing assembly comprising a plurality of ball bearing elements and a cage member caging the ball bearing elements between the exterior surface of said collet member and the interior wall of said housing, means providing an interference fit between each said bearing assembly and its respective collet member to limit axial movement of each bearing assembly relative to its respective collet member, and spring means disposed within said housing biasing said collet members axially relative to said housing in the direction of convergence of said interior wall to thereby force said ball bearing elements into contact with said interior wall, the construction being such that the collet members frictionally engage said shaft member upon the latter being urged relatively through said passage in the direction of convergence of said interior wall, said collet members disengaging said shaft member when the latter is urged in the opposite direction.

5. The clutch mechanism according to claim 2, wherein the interior wall of said housing and the exterior surfaces of said collet members are circular in cross-section and including inner engaging means keying said cage members to their respective collet members so as to prevent rotation of said cage members and the ball bearing elements caged thereby about said collet members.

6. A rungless ladder device comprising a pair of upright pole members, pivot means having limited freedom of pivotal movement joining said pole members, said pivot means comprising a pair of pivotally connected arms, one arm being secured to one pole member and the other arm being secured to the other pole member, lugs mounted on said arms and adapted to interengage to limit the pivotal movement of said arms, said lugs cooperating when said pole members are inclined against a structure in upright position to support said pole members in fixed parallel relation, a clutch member slidable on each said pole member, said clutch members being adapted to slide freely on the associated pole member when urged upwardly and being normally adapted to compressively engage the associated pole member when urged downwardly, each said clutch member including means to release the compressive engagement with the associated pole member so as to permit the clutch member to slide downwardly on its associated pole member, a pair of foot engaging stirrups for supporting an individual's feet, and a pair of rigid straps supporting said stirrups, there being one strap and associated stirrup hanging pivotally from each clutch member and operative to transmit an individual's foot movement to said clutch members.

References Cited in the file of this patent

UNITED STATES PATENTS

| 1,114,832 | Whitney | Oct. 27, 1914 |
| 1,754,132 | Bekkum | Apr. 8, 1930 |
| 1,918,293 | Seiler | July 18, 1933 |
| 1,964,995 | McLaughlin | July 3, 1934 |
| 2,774,430 | Blazek | Dec. 18, 1956 |
| 2,945,563 | O'Hara | July 19, 1960 |

FOREIGN PATENTS

| 307,466 | Germany | Aug. 29, 1918 |
| 569,474 | Belgium | Aug. 14, 1958 |
| 709,240 | Germany | Aug. 11, 1941 |